(12) United States Patent
Poegel et al.

(10) Patent No.: US 7,366,139 B2
(45) Date of Patent: Apr. 29, 2008

(54) SWITCHED COMBINING ANTENNA DIVERSITY TECHNIQUE

(75) Inventors: Frank Poegel, Dresden (DE); Wolfram Kluge, Dresden (DE); Eric Sachse, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1169 days.

(21) Appl. No.: 10/184,422

(22) Filed: Jun. 27, 2002

(65) Prior Publication Data

US 2003/0169706 A1 Sep. 11, 2003

(30) Foreign Application Priority Data

Mar. 8, 2002 (DE) ................. 102 10 238

(51) Int. Cl.
*H04Q 7/00* (2006.01)
(52) U.S. Cl. ............... 370/334; 343/893; 455/562.1; 455/575.7
(58) Field of Classification Search ............ 343/893; 370/333, 334, 339; 375/136, 137, 147, 148; 455/562.1, 575.7
See application file for complete search history.

(56) References Cited

U.S. PATENT DOCUMENTS

| | | | | |
|---|---|---|---|---|
| 5,131,006 A | * | 7/1992 | Kamerman et al. | 375/130 |
| 5,491,723 A | * | 2/1996 | Diepstraten | 375/267 |
| 5,530,926 A | * | 6/1996 | Rozanski | 455/277.2 |
| 5,692,019 A | * | 11/1997 | Chang et al. | 375/347 |
| 5,909,462 A | * | 6/1999 | Kamerman et al. | 375/147 |
| 6,002,672 A | * | 12/1999 | Todd | 370/252 |
| 6,067,449 A | * | 5/2000 | Jager | 455/277.2 |
| 6,097,774 A | * | 8/2000 | Sohlman et al. | 375/347 |

(Continued)

FOREIGN PATENT DOCUMENTS

DE 42 31 198 5/1993

(Continued)

OTHER PUBLICATIONS

Seling, T., "The Application of Automatice Gain Control to Microwave Radiometers," IEEE Transactions on Antennas and Propagation, vol. 12, Issue 5, Sep. 1964. pp. 636-639.*

(Continued)

*Primary Examiner*—Chi Pham
*Assistant Examiner*—Donald L Mills
(74) *Attorney, Agent, or Firm*—Meyertons Hood Kivlin Kowert & Goetzel, P.C.

(57) ABSTRACT

An antenna diversity method and a corresponding communication device are disclosed that may be used in wireless LAN receivers. An AGC (Automatic Gain Control) unit controls a gain when processing signals received from antennae. A periodical switching process is performed between at least two antennae. During this periodical switching process, signals from each of the antennae are received alternately. The gain obtained by processing each received signal by means of the AGC unit is monitored and the obtained gain is compared with a predetermined threshold value. When for one of the at least two antennae the gain is below the predetermined threshold value, the periodical switching process is stopped and the antenna used at the time when stopping the periodical switching process is selected. This technique may provide an improved antenna diversity of low complexity, high performance and a short settling time.

41 Claims, 6 Drawing Sheets

U.S. PATENT DOCUMENTS

| | | | |
|---|---|---|---|
| 6,141,392 A * | 10/2000 | Hoshikuki et al. | 375/347 |
| 6,289,036 B1 * | 9/2001 | Saito et al. | 375/130 |
| 6,990,117 B1 * | 1/2006 | Tanaka et al. | 370/447 |
| 2003/0100282 A1 * | 5/2003 | Kandala | 455/234.1 |

FOREIGN PATENT DOCUMENTS

| | | |
|---|---|---|
| DE | 691 28 673 | 7/1998 |
| EP | 1361666 A1 * | 11/2003 |
| JP | 08107380 | 4/1996 |
| WO | WO 2061961 A1 * | 8/2002 |

OTHER PUBLICATIONS

Liang, Liwan et al., "IF Amplifier Module for High-Sweep Speed LFMCW Radar," 2nd International Conference on Microwave and Millimeter Wave Technology, 2000, ICMMT 2000, Sep. 2000. pp. 662-665.*

* cited by examiner

SWITCHED COMBINING ANTENNA DIVERSITY TECHNIQUE

BACKGROUND OF THE INVENTION

1. Field of the Invention

The invention generally relates to communication devices and methods, and more specifically to switched combining antenna diversity techniques particularly in wireless LAN (Local Area Networks, WLAN) systems.

2. Description of the Related Art

In a mobile radio channel, the signal level received at an antenna depends strongly on the location of the reception point. There can be large variations in the signal level over rather short distances. This signal variation can lead to situations, where a receiver with a single antenna cannot receive a sufficiently strong signal to achieve acceptable performance. On the other hand, if more than one antenna is used, the chance that at least one antenna receives a sufficiently strong signal is increased. The approach of using several antennae that are spaced apart is called space or antenna diversity. Presently, several techniques for performing antenna diversity in a wireless communication receiver have been developed.

When a plurality of antennae are employed to pick up a radio signal, the question arises as to how to combine the signals that arrive at the antenna elements. The most common techniques are the so-called selective combining (FIG. 1), the maximal ratio combining (FIG. 2), the equal gain combining (FIG. 3) and the switched combining techniques.

The selective combining scheme is shown in FIG. 1. A selection combiner chooses the signal that has the highest instantaneous signal-to-interference ratio, so the output signal-to-interference ratio is equal to that of the best incoming signal. However, due to the fact that systems cannot receive signals from different antennae at the same time, the internal time constants have to be considerably shorter than the fading periods for the system to operate efficiently. Moreover, the measurement of each branch's signal-to-interference ratio is associated with an enhanced system complexity.

FIG. 2 shows another conventional technique, the so-called maximal ratio combining, wherein both the magnitude and the phase of weights in the combining network are adjusted in order to maximize the signal-to-noise ratio at the output of the combiner. A maximal ratio combining system could be implemented as an adaptive array, whose antenna elements are widely separated.

In an interference-free environment, a maximal ratio combining array could also be implemented as an adaptive array without using feedback from the array output to adjust amplitude weighting of each branch. In such a maximal ratio combining implementation, the signals from each antenna are weighted proportionally to their signal-to-noise power ratios and then summed. While a maximal ratio combining array can achieve optimal performance in the presence of noise, it does not provide the ability to reject interference.

Equal gain combining, as shown in FIG. 3, is a diversity technique in which the desired signals present at each antenna element are co-phased and then added together. There is no attempt to weight the signals before addition. The possible separation of the antennae varies with the antenna height and with the frequency. The higher the frequency, the closer the antennae can be arranged to each other.

These antenna diversity techniques are disadvantageous since they need separate receivers REC, each including a radio frequency and base band part, in each branch. This is a requirement that leads to considerably high system costs.

In order to avoid the system complexity associated with estimating each branch's signal-to-noise ratio using separate circuitry, the so-called switched combining technique has been developed, which monitors only the currently selected branch's signal-to-noise ratio and then switches the branches as shown in FIG. 4.

However, existing switched combining systems may take an unacceptably long time for detecting when the signal-to-noise ratio drops below the acceptable threshold. This reduces the time available for synchronization, equalization etc. and may therefore reduce the signal quality or even lead to data loss.

SUMMARY OF THE INVENTION

A method of selecting one of at least two antennae of a communication device and a corresponding communication device and wireless LAN receiver are disclosed that may provide an improved antenna diversity having low complexity, high performance and short settling time.

In one embodiment, an antenna diversity method is provided wherein the communication device comprises an AGC (Automatic Gain Control) unit for controlling a gain when processing signals received from a selected antenna. In the method, a periodical switching process is performed between at least two antennae. During this periodical switching process, signals from each of the antennae are received alternately and the received signals are processed by means of the AGC unit. The gain obtained by processing each received signal by means of the AGC unit is monitored and the obtained gain is compared with a predetermined threshold value. When for one of the at least two antennae the gain is below the predetermined threshold value, the periodical switching process is stopped and the antenna used at the time when stopping the periodical switching process is selected.

In another embodiment, a communication device comprises at least two antennae, an antenna switch for switching between the at least two antennae, an AGC unit for controlling a gain, and a diversity controller for controlling the antenna switch to select one of the at least two antennae. The diversity controller is coupled to an output of the AGC unit for receiving a gain signal indicating a gain value and to a control input of the antenna switch for controlling the operation of said antenna switch, and comprises a threshold detector for determining whether the gain value indicated by the received gain signal is below a predetermined threshold value. Further, the diversity controller is arranged for starting a periodic switching process, determining whether the gain value for one of the at least two antennae is below said predetermined threshold value, and if so, stopping said periodic switching process.

In a further embodiment, a wireless LAN receiver may be provided that comprises at least two antennae, an antenna switch for switching between the at least two antennae, an AGC unit for controlling a gain, and a diversity controller for controlling the antenna switch to select one of the at least two antennae. The diversity controller is coupled to an output of the AGC unit for receiving a gain signal indicating a gain value and to a control input of the antenna switch for controlling the operation of said antenna switch, and comprises a threshold detector for determining whether the gain value indicated by the received gain signal is below a predetermined threshold value. Further, the diversity controller is arranged for starting a periodic switching process, determining whether the gain value for one of the at least two antennae is below said predetermined threshold value, and if so, stopping said periodic switching process.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention is illustrated in the accompanying drawings, wherein.

DETAILED DESCRIPTION OF THE INVENTION

The illustrated embodiments of the present invention will be described with reference to the figure drawings wherein like elements and structures are indicated by like reference numbers.

Figure 1:
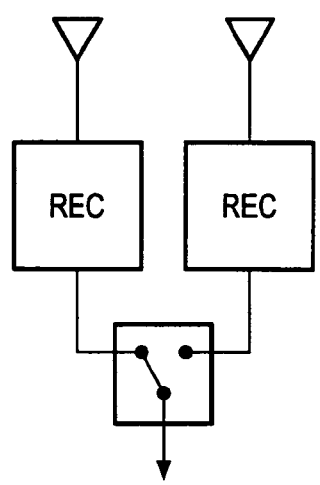
FIG. 1 is a schematic diagram illustrating the selective combining antenna diversity technique.
Figure 2:
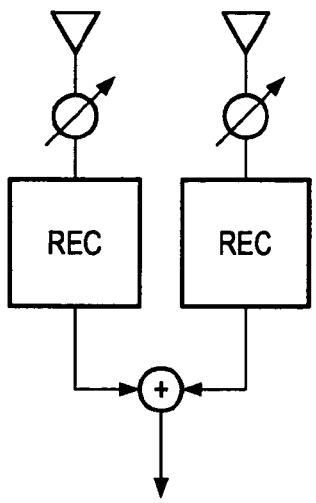
FIG. 2 is a schematic diagram illustrating the maximal ratio combining antenna diversity technique.
Figure 3:
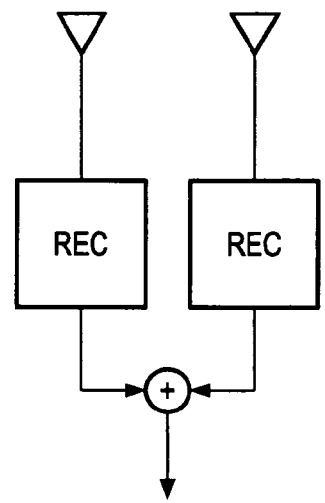
FIG. 3 is a schematic diagram illustrating the equal gain combining antenna diversity technique.
Figure 4:
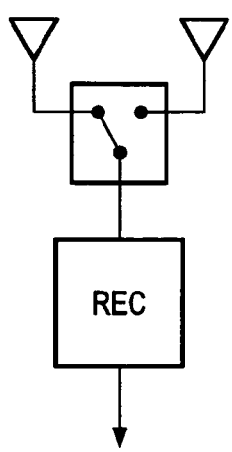
FIG. 4 illustrates the switched combining antenna diversity technique.
Figure 5:
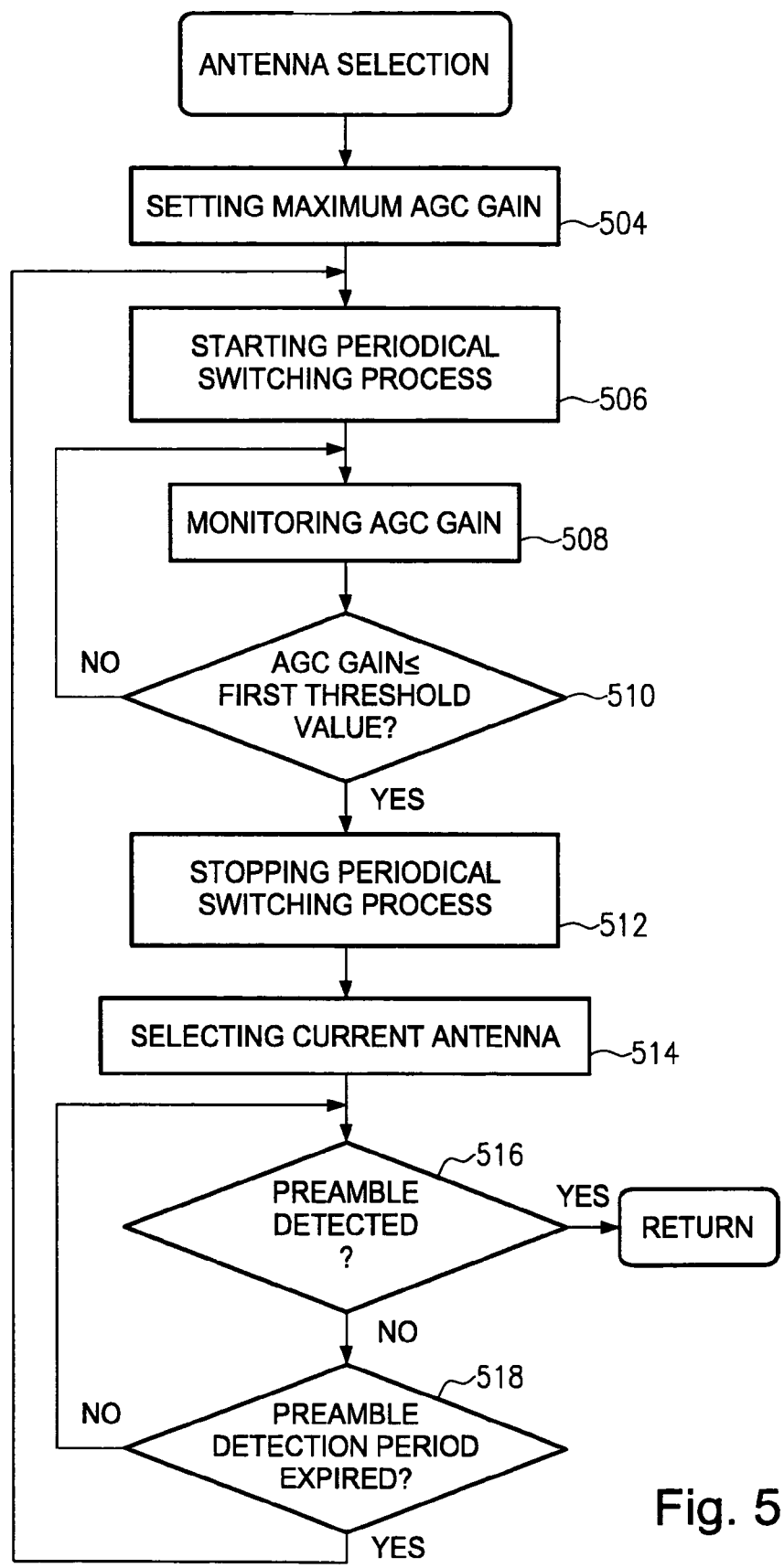
FIG. 5 is a flowchart showing a method of selecting one of two antennae of a communication device according to a first embodiment.

Referring now to the drawings and in particular to FIG. 5 which is a flowchart of an antenna diversity method of selecting one of at least two antennae of a communication device, the process shown therein enables a communication device to select an adequate antenna within a time that is preferably shorter than the length of a preamble within a signal frame. Preambles will now be described with reference to FIG. 6.

Figure 6:
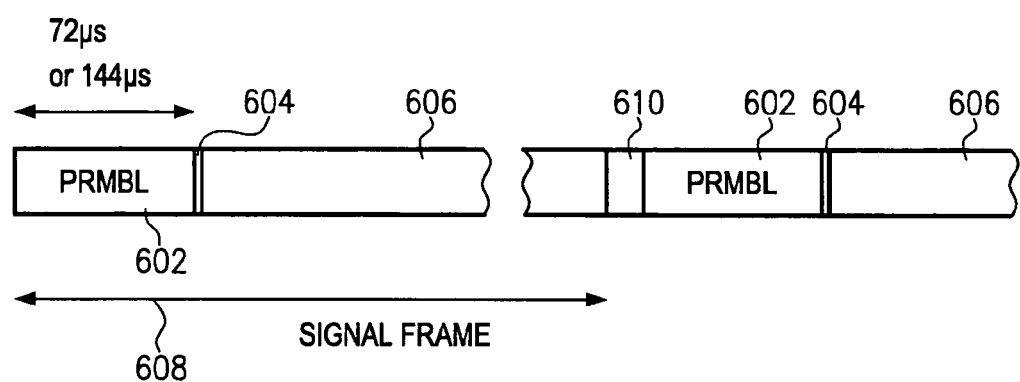
FIG. 6 is a timing diagram of a data communication encoding format.

As shown in FIG. 6, wherein a timing diagram of a data communication encoding format is shown, each signal frame 608 begins with a preamble 602 that comprises a bit pattern which may have a duration of e.g. 72 microseconds for a short preamble or 144 microseconds for a long preamble. The preamble 602 may comprise a sync field of 56 or 128 microseconds, respectively, and a 16 microseconds SDF (start of frame delimiter) and may be followed by a header 604. The header 604 is followed by the subsequent information 606 of this particular signal frame 608 and may have a length of 24 or 48 microseconds. Between the frames there is provided a pause 610 of for instance 10 microseconds or more.

Turning now back to FIG. 5, at step 504 the maximum gain is set for the AGC unit. For this purpose, the AGC unit performs a power measurement, a maximum value measurement or the like and adjusts the AGC gain accordingly. Between the frames, i.e. during the pause 610, normally only thermal noise is received. Therefore, only a small signal is detected and the AGC is adjusted to the maximum value. The AGC unit operates in the RF front end and is independent of the base band. The base band may give a reset or hold to the AGC unit.

A periodical switching process between the two antennae is performed at step 506 using a cycle time of about 5 microseconds. Other cycle time values may of course also be chosen. This periodical switching process is also performed during the pauses 610 between two frames. The resulting AGC gain is monitored at step 508.

Generally, in case the gain of the AGC unit is high, this may be due to an unsatisfactory signal at the current antenna. Only when the gain is low, the signal at the current antenna can be considered as sufficiently high. Therefore, it is decided in step 510 whether the gain is fallen below a certain threshold value, that is, whether the signal strength with the currently switched antenna is above a certain threshold. If this condition is fulfilled, the periodical switching process is stopped at step 512 and the current antenna is selected for the entire signal frame at step 514.

As shown by steps 516 and 518, it may be decided, whether within a predetermined period, which is less than the length of the preamble, a preamble was detected. If not, the antenna might have been selected due to a noise signal, such as a microwave signal. In this case, the process returns to step 506 of starting the periodical switching process. Generally, the periodical switching process is always active, unless a frame is processed.

Figure 7:
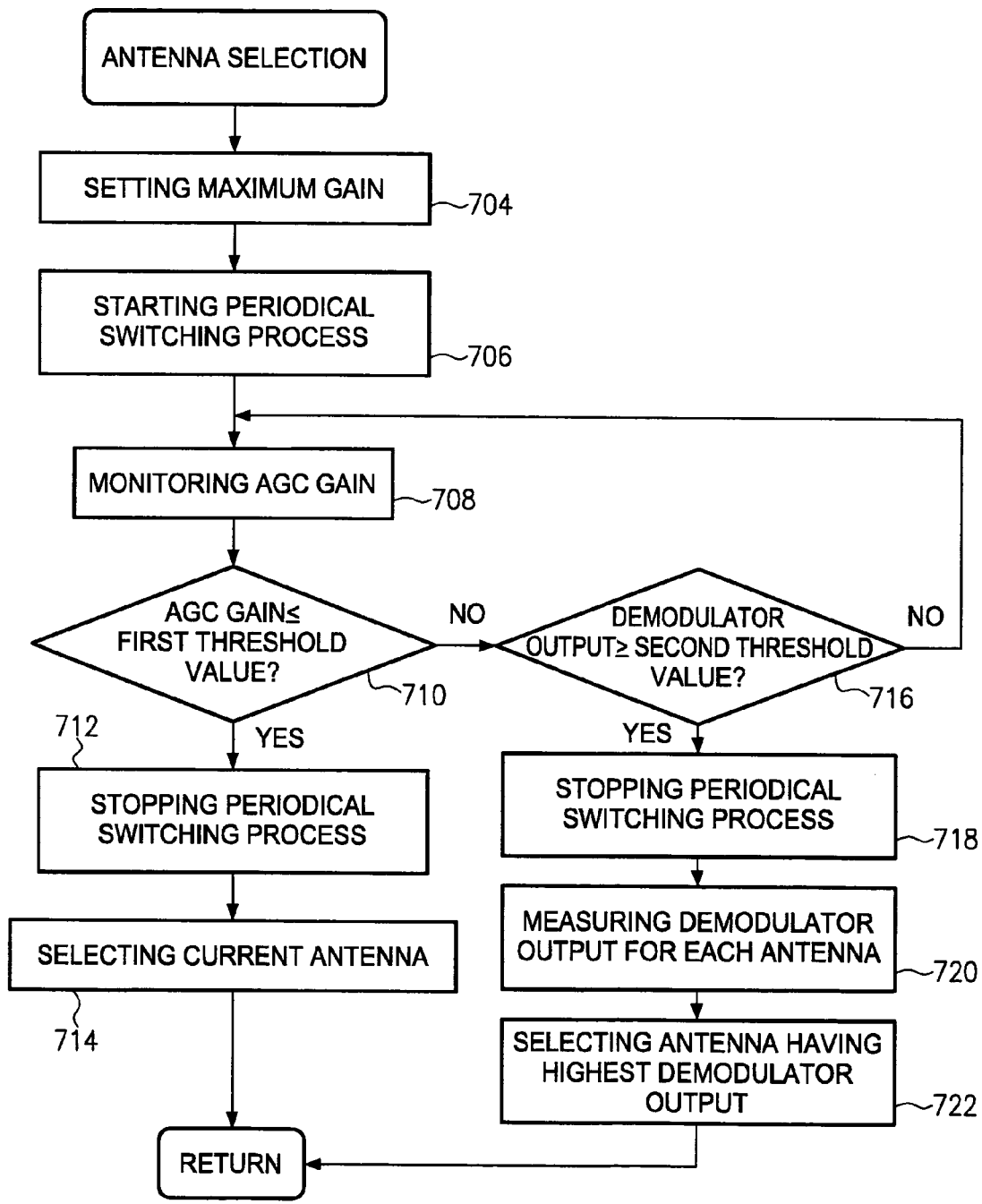
FIG. 7 is a flowchart of a method of selecting one of two antennae of a communication device according to a second embodiment.

Referring now to FIG. 7, a flowchart of an antenna selection process in accordance with another embodiment is shown. The process again begins with adjusting the gain of the AGC unit, usually to a maximum value, in step 704. In step 706, a periodical switching process between the two antennae is started. The gain of the AGC unit is monitored at step 708 and at step 710, it is decided on whether this gain has dropped below a predetermined threshold value.

If this is the case, the periodical switching process is stopped (step 712) and the current antenna is selected (step 714) in much the same way as in the embodiment shown in FIG. 5. However, in case the gain of the AGC unit remains at a higher value than the predetermined threshold value, it is decided according to the present embodiment on whether a demodulator output is above a predetermined second threshold value (step 716). In case the demodulator output has not reached the second threshold value, the step 708 of monitoring the gain of the AGC unit is performed again. However, in case the demodulator output has reached the second threshold value, the periodical switching process is stopped in step 718 and for each antenna, a demodulator output is measured in step 720. Accordingly, the antenna that has the highest demodulator output is selected for receiving the remainder of the signal frame in step 722.

Of course, additional steps corresponding to the steps 516 and 518 shown in FIG. 5 may also be implemented after steps 714 and/or 722.

According to a further advantageous embodiment, the process can return immediately to step 712, if during performing step 720 the AGC gain is falling under the first predetermined threshold value.

Figure 8:
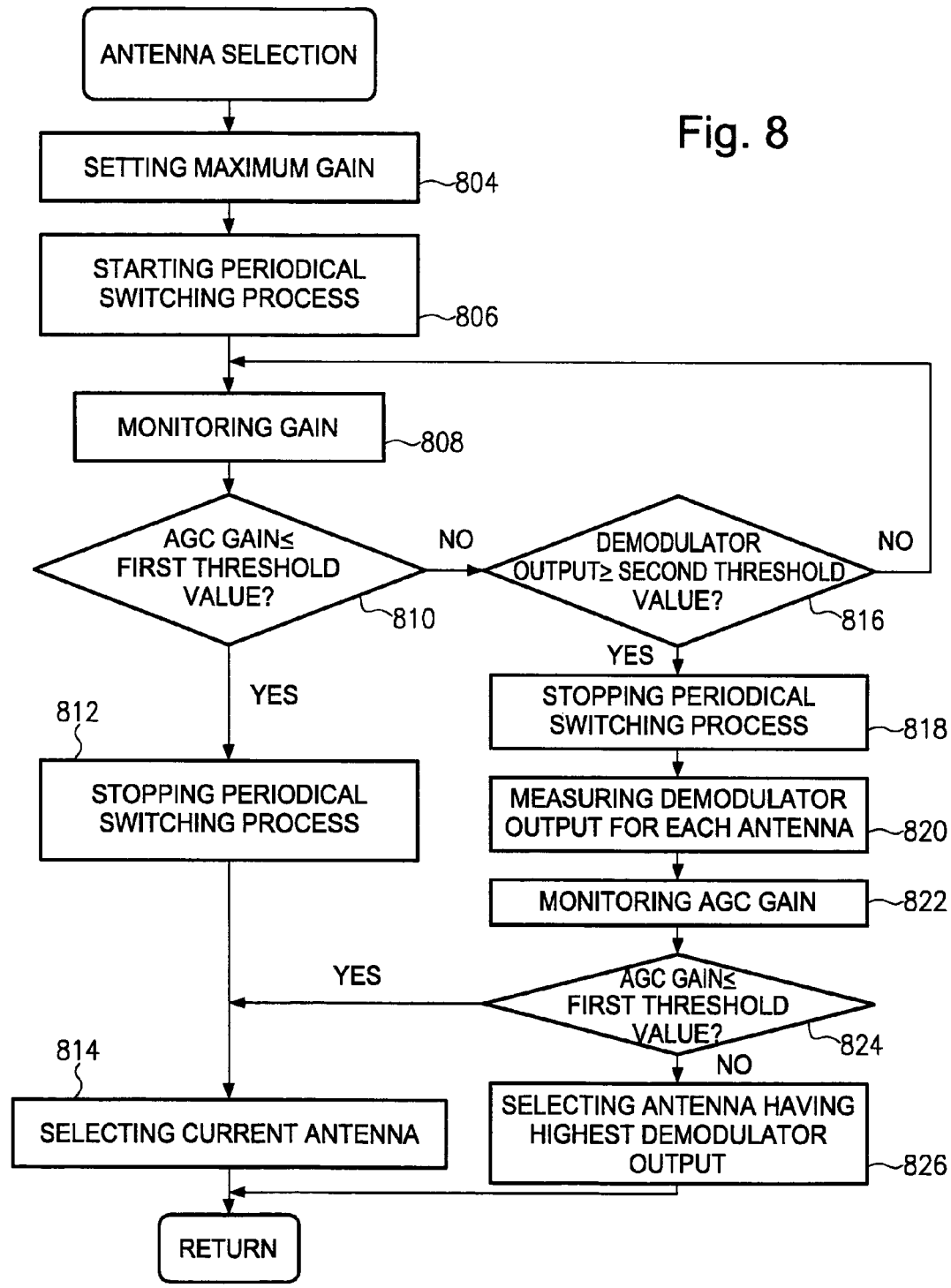
FIG. 8 is a flowchart of a method of selecting one of two antennae of a communication device according to a third embodiment.

Referring to FIG. 8, a flowchart of an antenna selection process according to another embodiment begins with adjusting the AGC gain, preferably to its maximum value, at step 804. A periodical switching process between the two antennae is started in step 806 and the gain of the AGC unit is monitored in step 808. At step 810, it is decided whether the AGC gain is fallen below a predetermined threshold value. If this is the case, the periodical switching process is stopped in step 812 and the current antenna is selected for receiving the rest of the signal frame in step 814. Again, steps corresponding to steps 516 and 518 shown in FIG. 5 may be implemented after step 814.

However, if the AGC gain did not fall below the predetermined first threshold value in step 810, it is decided in step 816 whether a demodulator output has reached a predetermined second threshold value. If not, step 808 of monitoring the AGC gain is performed again.

If, however, the demodulator output has reached the second threshold value in step 816, the periodical switching process is stopped in step 818. At step 820, the demodulator output for each antenna is measured and in step 822, the AGC gain is monitored again. In case that in step 824, the AGC gain has fallen below the predetermined first threshold value, step 814 of selecting the current antenna is performed. However, if in step 824, it is decided that the AGC gain has not fallen below the first threshold value, the antenna having the highest demodulator output is selected in step 826. A still faster antenna selection can be achieved by performing steps 824 and 820 in parallel. If step in step 824 a positive answer is detected, the process immediately advances to step 814 without finishing step 820. The complete processing of step 820 may take for instance 10 microseconds.

As described above, there are several different embodiments possible. During the periodical switching process there may be a separate detection of whether a second threshold value of a demodulator output has been reached or not. If this is the case, the periodical switching process may be stopped. It is to be noted that the detection whether the demodulator output has reached the second threshold value may be performed whenever it is detected in the comparison that the gain for each of the at least two antennae is above the predetermined threshold value. In another embodiment, the detection may be performed independently from the comparison of the obtained gain with the predetermined threshold value.

In yet another embodiment, when the periodical switching process is stopped, an output signal of the demodulator may be determined for each of the at least two antennae, the determined output signals may be compared and the antenna may be selected in response to the comparison of the output signals of the demodulator. This antenna selection in response to the comparison of the output signals of the demodulator may comprise a selection of the antenna that has the highest value of the output signal of the demodulator. Alternatively, or in addition to the above antenna selection scheme, an error rate may be determined in relation to each of the determined output signals. The determined error rates may be compared with each other and the antenna that has the lowest error rate may be selected.

According to a further approach, the antenna selection in response to the comparison of the output signals of the demodulator may comprise receiving signals from each antenna, processing the received signals by means of the AGC unit, monitoring the gain obtained by processing each received signal by means of the AGC unit, comparing the obtained gain with the predetermined threshold value, and if for at least one of the antennae the gain is below the threshold, selecting the antenna for which the gain is lower than for the other antennae. In one embodiment, if for none of the at least two antennae the gain is below the predetermined threshold value, the antenna that has the highest value of the output signal of the demodulator is selected. In another embodiment, if for none of the at least two antennae the gain is below said predetermined threshold value, an error rate relating to each of said determined output signals is determined, the determined error rates relating to the determined output signals are compared with each other, and the antenna that has the lowest error rate is selected.

It is to be noted that the demodulator, whose output is measured in step 820, may be a DBPSK (Differential Binary Phase Shift Keying) demodulator, which is located after a Barker matched filter. Both blocks belong to a preamble detector as will be described in more detail below with reference to FIGS. 9 and 10.

Figure 9:
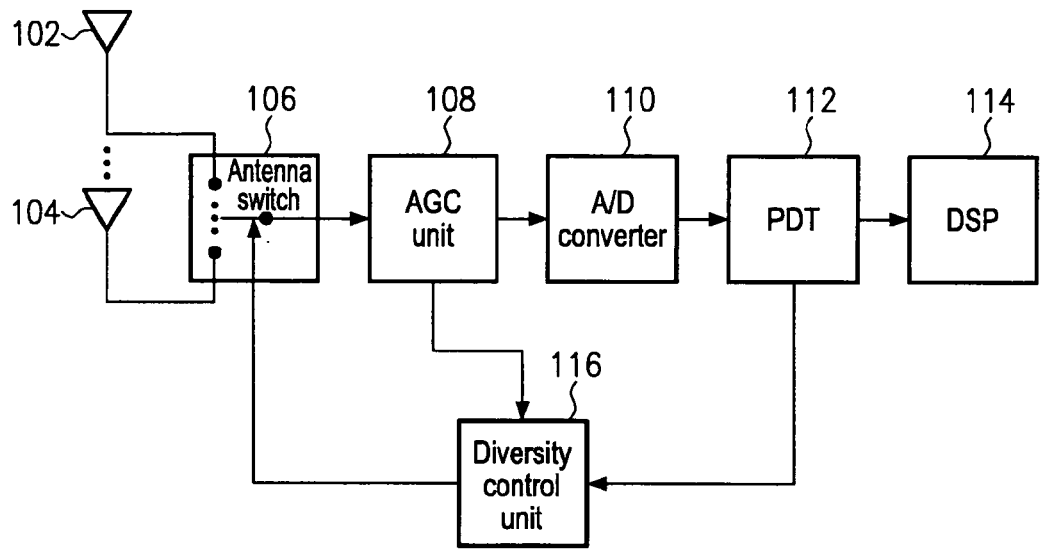
FIG. 9 is a block diagram of a communication device according to one embodiment.

Referring first to FIG. 9, an electrical block diagram of a communication device 100 having a switch diversity reception in accordance with an embodiment described herein comprises at least a first and a second antenna 102, 104. The first and second antennae 102, 104 are coupled to an antenna switch 106 for switching between the first and second antennae 102, 104 as a source input for an AGC (Automatic Gain Control) unit 108. A/D (analog-to-digital) converter 110 converts the signal received from the AGC unit 108 into digital data that can be processed by the PDT (Preamble Detection) circuit 112. One output of the PDT 112 is coupled to the DSP (Digital Signal Processing) circuit 114. Another output of the PDT 112 is coupled to a diversity control unit 116. The diversity control unit 116 controls the operation of the antenna switch 106, dependent on a control signal which is input to the diversity control unit 116 from the AGC unit 108.

Figure 10:
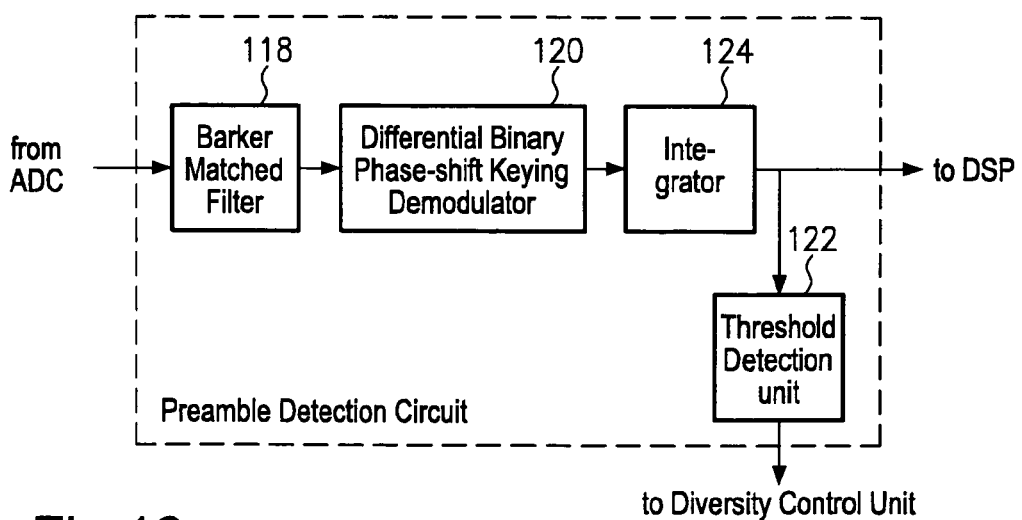
FIG. 10 is a block diagram of the preamble detection unit of the device shown in FIG. 9.

As shown in FIG. 10, the preamble detection circuit 112 may comprise a Barker matched filter 118 which receives the signal from the A/D converter 110 and is coupled to a differential binary phase-shift keying demodulator 120. The preamble detection circuit further comprises a threshold detection unit 122 which is coupled to the diversity control unit 116 and to the output of an integrator 124, which receives the output of the differential binary phase shift keying demodulator 120.

Various embodiments as described above may provide a simple method of selecting one of at least two antennae of a communication device with high performance and a short settling time. The arrangement of FIGS. 9 and 10 may have the advantage that it is of a low complexity and reuses existing components. By selecting the best antenna, that is the antenna with a low error rate for the actual frame, a reduced signal-to-noise ratio which is required for a certain error rate may be achieved.

This ensures sufficient time for other procedures, such as synchronization, equalization or the like before the payload of the frame or packet. The diversity control unit according to the embodiments as described above may consist of a state machine only and a complicated signal processing may be avoided even when using conventional techniques in the blocks. The antenna selection process according to the embodiments shown above is very fast if the received signal strength at one antenna or at both antennae is above a certain threshold. In this case, time-consuming measurements with the at least two antennae are not required.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention.

For instance, while in FIGS. 5, 7 and 8 processes have been described as sequences of method steps, it is to be noted that other sequences may likewise be used. For example, although the depicted processes show that the maximum gain is set in steps 504, 704 and 804 after the begin of the preamble has been detected, the gain setting may also be performed in advance. Other modifications of method step sequences are apparent to those of ordinary skill in the art.

In addition, those areas in which it is believed that those ordinary skilled in the art are familiar have not been described herein in order to not unnecessarily obscure the invention described herein. Accordingly, it is to be understood that the invention is not to be limited by the specific illustrated embodiments, but only by the scope of the appended claims.

What is claimed is:

1. An antenna diversity method of operating a communication device, the communication device comprising at least two antennae and an AGC (automatic gain control) unit for controlling an AGC gain when processing received signals, the method comprising:
   periodically switching between the at least two antennae and, during this periodical switching process, alternately receiving signals from each of the antennae, processing the received signals by the AGC unit, monitoring the AGC gain obtained by processing each received signal by the AGC unit and comparing the obtained AGC gain with a predetermined threshold value;
   stopping the periodical switching process when for one of the at least two antennae the AGC gain is below the predetermined threshold value; and
   selecting the antenna used at the time when stopping the periodical switching process.

2. The method of claim 1, wherein said periodical switching process is performed during a preamble detection within a signal frame and the selected antenna is used for receiving the remaining data of the signal frame.

3. The method of claim 1, further comprising:
   setting the AGC gain of the AGC unit to a predetermined maximum value before starting the periodical switching process.

4. The method of claim 1, further comprising:
   measuring an output value of an output signal of a demodulator for each of the at least two antennae; and
   comparing the measured output value of each of the output signals.

5. The method of claim 4, wherein said measuring of an output signal of the demodulator for each of the at least two antennae is performed independently from the comparison of the obtained AGC gain with the predetermined threshold value.

6. The method of claim 4, wherein the measured output value is a signal-to-interference ratio, and wherein said antenna selection in response to the comparison of the output signals of the demodulator comprises:
   selecting the antenna that corresponds to the output signal having a highest measured signal-to-interference value.

7. The method of claim 4, wherein the output value is an error rate and wherein said antenna selection in response to the comparison of the output signals of the demodulator comprises:
   determining the error rate relating to each of said output signals;
   comparing the determined error rates relating to the output signals; and
   selecting the antenna corresponding to the output signal that has the lowesterror rate.

8. The method of claim 4, wherein said antenna selection in response to the comparison of the output signals of the demodulator comprises:
   receiving signals from each of the at least two antennae;
   processing the received signals by the AGC unit;
   monitoring the AGC gain obtained by processing each received signal by the AGC unit;
   comparing the obtained AGC gain with said predetermined threshold value; and
   if for at least one of the at least two antennae the AGC gain is below said predetermined threshold value, selecting the antenna for which the AGC gain is lower than the other antennae.

9. The method of claim 8, further comprising:
   if the AGC gain of the at least two antennae is not below said predetermined threshold value, selecting the antenna that corresponds to the output signal having a highest signal-to-interference value.

10. The method of claim 8, further comprising:
    if the AGC gain of the at least two antennae is not below said predetermined threshold value, determining an error rate relating to each of said determined output signals, comparing the determined error rates relating to the determined output signals, and selecting the antenna that has the lowest error rate.

11. The method of claim 4, wherein said determination of an output signal of the demodulator for each of the at least two antennae comprises:
    passing an output signal of a Barker matched filter to the demodulator.

12. The method of claim 4, wherein said demodulator is a DBPSK (Differential Binary Phase-Shift Keying) demodulator.

13. The method of claim 1, wherein a period of said periodical switching is substantially shorter than the length of one preamble within a signal frame.

14. The method of claim 13, wherein the length of said preamble within a signal frame is 72 microseconds.

15. The method of claim 13, wherein the length of said preamble within a signal frame is 144 microseconds.

16. The method of claim 1, wherein the received signals that are processed by the AGC unit are analog signals.

17. The method of claim 1, wherein said periodical switching process includes alternating between the antennae each 5 microseconds.

18. The method of claim 1, for operating a wireless LAN (Local Area Network) receiver.

19. A communication device comprising:
    at least two antennae,
    an antenna switch for switching between the at least two antennae,
    an AGC (automatic gain control) unit for controlling an AGC gain, and
    a diversity controller for controlling the antenna switch to select one of the at least two antennae,
    wherein said diversity controller is coupled to an output of the AGC unit for receiving an AGC gain signal indicating an AGC gain value and to a control input of the antenna switch for controlling the operation of said antenna switch, and comprises a threshold detector for determining whether the AGC gain value indicated by the received AGC gain signal is below a predetermined threshold value,
    wherein the diversity controller is arranged for starting a periodic switching process, determining whether the AGC gain value for one of the at least two antennae is below said predetermined threshold value, and if so, stopping said periodic switching process.

20. The communication device of claim 19, further comprising a preamble detection circuit having a Barker matched filter and a demodulator connected in series, wherein the diversity controller is connected to receive an output signal of the demodulator and is arranged for comparing the demodulator output signal for each of the at least two antennae.

21. The communication device of claim 20, wherein said demodulator is a DBPSK (Differential Binary Phase-Shift Keying) demodulator, and the communication device further comprises an analog-to-digital converter being connected to receive an analog output of the AGC unit, converting the analog signal into a digital signal, and providing the digital signal to the preamble detection circuit.

22. The communication device of claim 19, wherein said communication device is a wireless LAN (Local Area Network) receiver.

23. The communication device of claim 19, wherein:
said diversity controller is arranged for performing said periodical switching process during a preamble detection within a signal frame; and
the communication device is arranged for using a selected antenna for receiving the remaining data of the signal frame.

24. The communication device of claim 19, wherein said AGC unit is arranged for setting the AGC gain to a predetermined maximum value before the periodical switching process is started.

25. The communication device of claim 19, wherein the diversity controller is arranged for determining an output value of an output signal of a demodulator for each of the at least two antennae and comparing the determined output value of each of the output signals.

26. The communication device of claim 25, wherein said diversity controller is arranged for performing said determination of the output values of the output signals of the demodulator independently from the determination result of the threshold detector.

27. The communication device of claim 26, wherein the output value is a signal-to-interference ratio, and wherein the diversity controller is arranged for selecting the antenna that corresponds to the output signal having the highest signal-to-interference value of the demodulator.

28. The communication device of claim 23, wherein the output value is an error rate, and wherein the diversity controller is arranged for determining an error rate relating to each of said determined output signals, comparing the determined error rates relating to the output signals, and selecting the antenna corresponding to the output signal that has the lowest error rate.

29. The communication device of claim 23, wherein the diversity controller is arranged for receiving signals from each of the at least two antennae, processing the received signals by the AGC unit, monitoring the AGC gain obtained by processing each received signal by the AGC unit, comparing the obtained AGC gain with said predetermined threshold value, and if for at least one of the at least two antennae the AGC gain is below said predetermined threshold value, selecting the antenna for which the AGC gain is lower than the other antennae.

30. The communication device of claim 29, wherein the diversity controller is further arranged for, if the AGC gain of the at least two antennae is not below said predetermined threshold value, selecting the antenna that corresponds to the output signal having a highest signal-to-interference value.

31. The communication device of claim 29, wherein the diversity controller is further arranged for, if the AGC gain of the at least two antennae is not below said predetermined threshold value, determining an error rate relating to each of said determined output signals, comparing the determined error rates relating to the determined output signals, and selecting the antenna that has the lowest error rate.

32. The communication device of claim 23, further comprising:
a Barker matched filter connected to an input terminal of the demodulator.

33. The communication device of claim 19, wherein a period of said periodical switching is substantially shorter than the length of one preamble within a signal frame.

34. The communication device of claim 33, wherein the length of said preamble within a signal frame is 72 microseconds.

35. The communication device of claim 33, wherein the length of said preamble within a signal frame is 144 microseconds.

36. The communication device of claim 19, wherein the received signals that are processed by the AGC unit are analog signals.

37. The communication device of claim 19, wherein said periodical switching process includes alternating between the antennae each 5 microseconds.

38. A wireless. LAN (Local Area Network) receiver comprising:
at least two antennae,
an antenna switch for switching between the at least two antennae,
an AGC (automatic gain control) unit for controlling an AGC gain, and
a diversity controller for controlling the antenna switch to select one of the at least two antennae,
wherein said diversity controller is coupled to an output of the AGC unit for receiving a an AGC gain signal indicating an AGC gain value and to a control input of the antenna switch for controlling the operation of said antenna switch, and comprises a threshold detector for determining whether the AGC gain value indicated by the received AGC gain signal is below a predetermined threshold value,
wherein the diversity controller is arranged for starting a periodic switching process, determining whether the AGC gain value for one of the at least two antennae is below said predetermined threshold value, and if so, stopping said periodic switching process.

39. The wireless LAN receiver of claim 38, further comprising a preamble detection circuit having a Barker matched filter and a demodulator connected in series, wherein the diversity controller receives an output signal of the demodulator and is arranged for comparing the demodulator output signal for each of the at least two antennae.

40. The wireless LAN receiver of claim 39, wherein said demodulator is a DBPSK (Differential Binary Phase-Shift Keying) demodulator.

41. The wireless LAN receiver of claim 39, further comprising an A/D (analog-to-digital) converter being connected to receive an analog output of the AGC unit, converting the analog signal into a digital signal, and providing the digital signal to the preamble detection circuit.

* * * * *

UNITED STATES PATENT AND TRADEMARK OFFICE
CERTIFICATE OF CORRECTION

| | | |
|---|---|---|
| PATENT NO. | : 7,366,139 B2 | Page 1 of 1 |
| APPLICATION NO. | : 10/184422 | |
| DATED | : April 29, 2008 | |
| INVENTOR(S) | : Frank Poegel, Wolfram Kluge and Eric Sachse | |

It is certified that error appears in the above-identified patent and that said Letters Patent is hereby corrected as shown below:

Col. 8, line 4, please change "lowesterror" to --lowest error--.

Signed and Sealed this

Fourteenth Day of October, 2008

JON W. DUDAS
*Director of the United States Patent and Trademark Office*